United States Patent
Peters

(10) Patent No.: US 7,546,738 B2
(45) Date of Patent: Jun. 16, 2009

(54) TURBINE ENGINE NOZZLE

(75) Inventor: Donald W. Peters, Colchester, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 11/026,955

(22) Filed: Dec. 31, 2004

(65) Prior Publication Data

US 2006/0144036 A1 Jul. 6, 2006

(51) Int. Cl.
*F02K 1/12* (2006.01)
(52) U.S. Cl. .................. 60/771; 239/265.41
(58) Field of Classification Search .......... 60/771; 239/265.37, 265.39, 265.41
See application file for complete search history.

(56) References Cited

U.S. PATENT DOCUMENTS

| 3,730,436 | A |   | 5/1973  | Madden et al. |
|-----------|---|---|---------|---------------|
| 5,011,080 | A | * | 4/1991  | Barcza et al. ......... 239/265.39 |
| 5,797,544 | A |   | 8/1998  | Ward |
| 5,842,643 | A | * | 12/1998 | Lippmeier ............ 239/265.39 |
| 6,398,129 | B1 |  | 6/2002  | Johnson |
| 6,779,336 | B2 |  | 8/2004  | Allore et al. |
| 7,225,622 | B2 | * | 6/2007 | Petty et al. .................... 60/771 |
| 2001/0018024 | A1 | | 8/2001 | Hyde et al. |

* cited by examiner

*Primary Examiner*—Louis J Casaregola
(74) *Attorney, Agent, or Firm*—Bachman & LaPointe, P.C.

(57) ABSTRACT

A turbine engine nozzle assembly has an upstream flap and a downstream flap pivotally coupled thereto for relative rotation about a hinge axis. An actuator linkage is coupled to the flaps for actuating the nozzle between a number of throat area conditions. First and second mode struts respectively restrict rotation of the downstream flap in first and second directions.

13 Claims, 8 Drawing Sheets

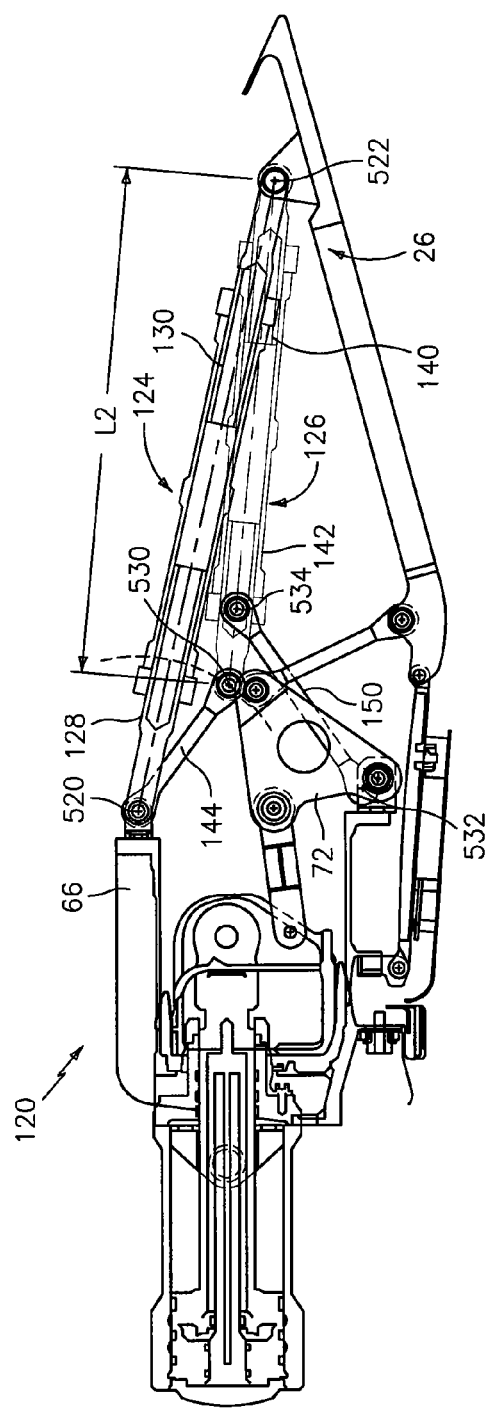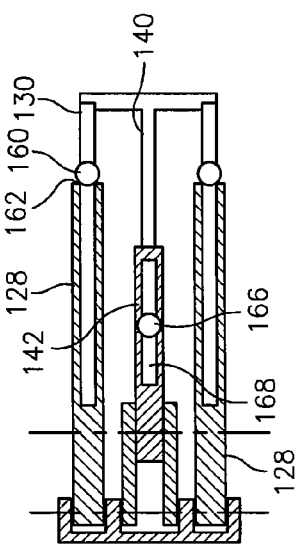
FIG. 4
FIG. 5

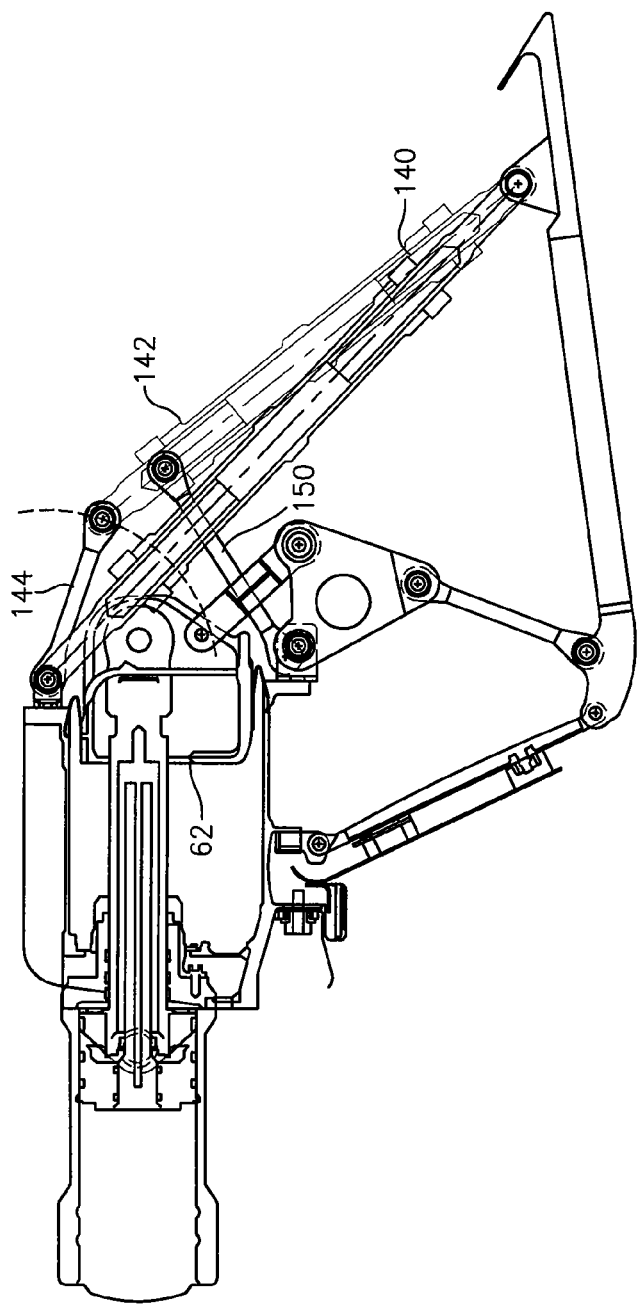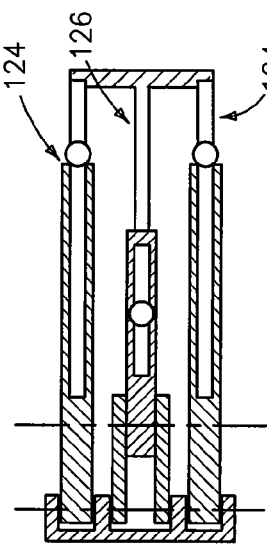
FIG. 8
FIG. 9

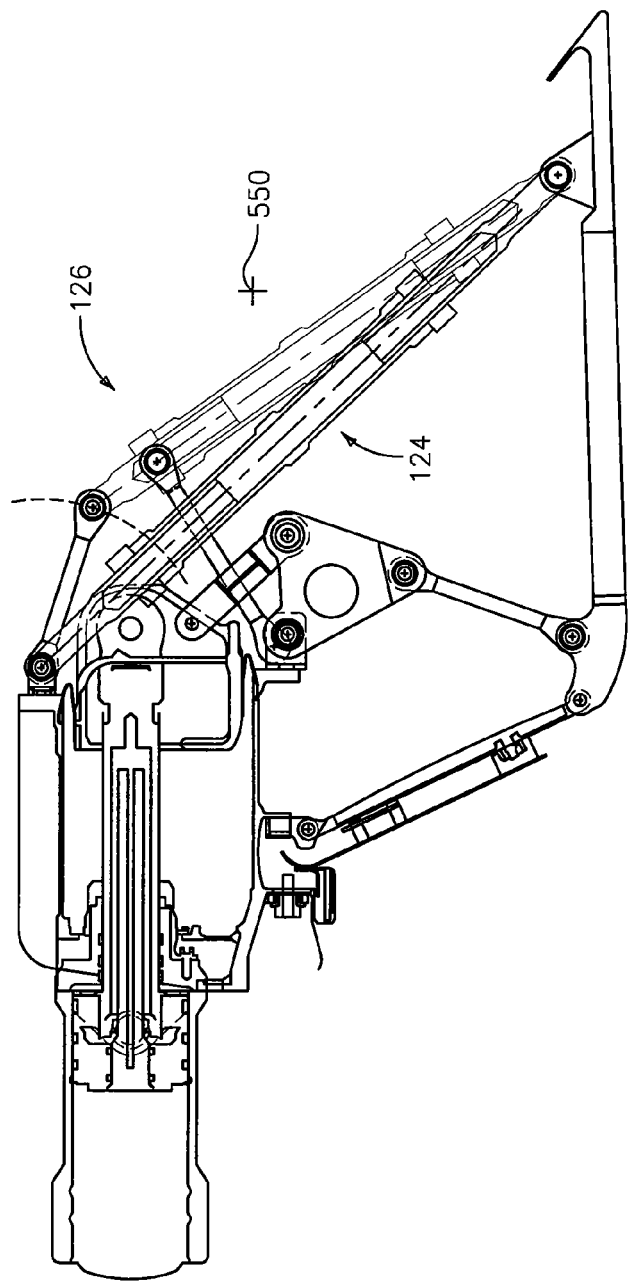
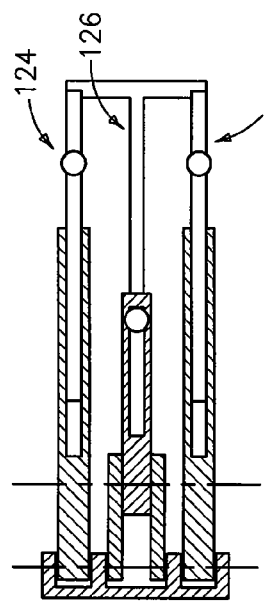
FIG. 10
FIG. 11

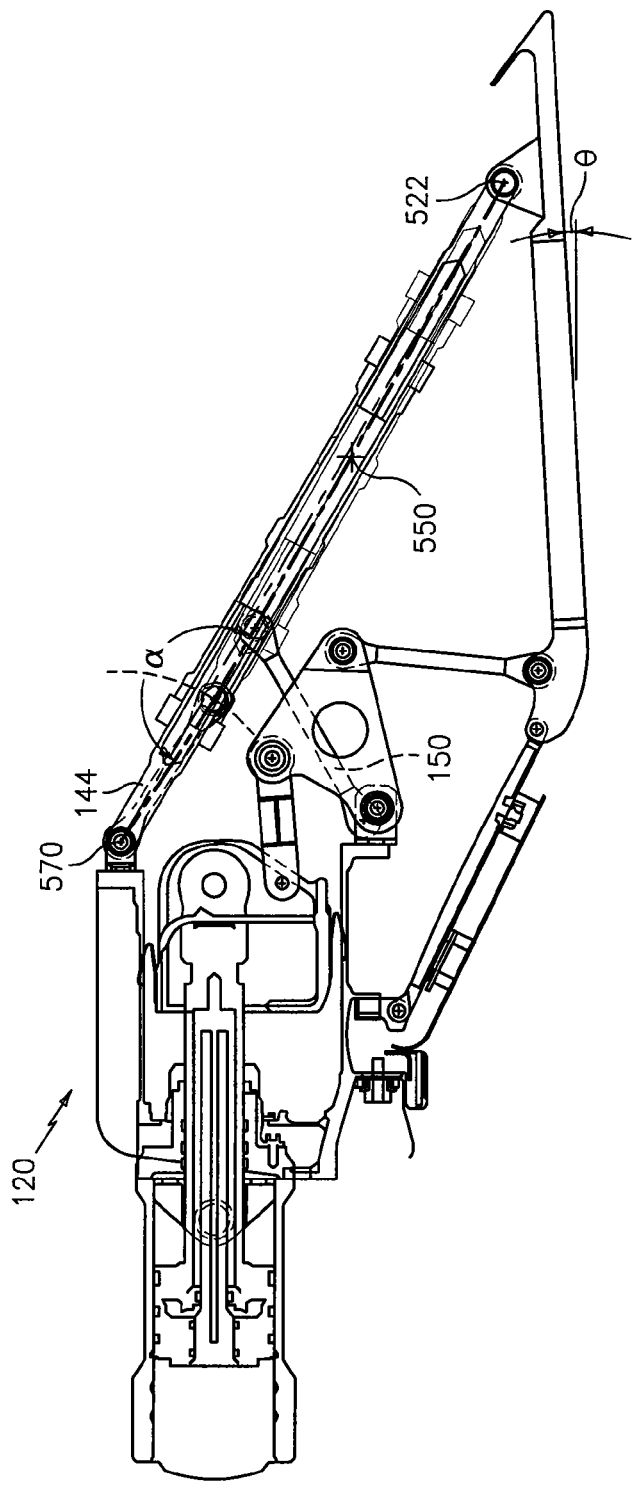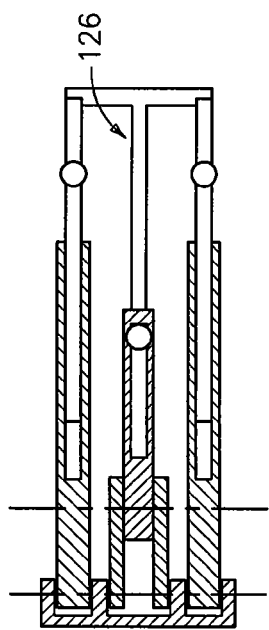
FIG. 12
FIG. 13

TURBINE ENGINE NOZZLE

U.S. GOVERNMENT RIGHTS

The invention was made with U.S. Government support under contract no. N00019-02-C-3003 awarded by the U.S. Navy. The U.S. Government has certain rights in the invention.

BACKGROUND OF THE INVENTION

The invention relates to turbine engines. More particularly, the invention relates to variable throat turbine engine exhaust nozzles.

There is well developed field in turbine engine exhaust nozzles. A number of nozzle configurations involve pairs of relatively hinged flaps: a convergent flap upstream; and a divergent flap downstream. Axisymmetric nozzles may feature a circular array of such flap pairs. Exemplary nozzles are shown in U.S. Pat. Nos. 3,730,436, 5,797,544, and 6,398,129.

SUMMARY OF THE INVENTION

Accordingly, one aspect of the invention involves a turbine engine nozzle subassembly. A downstream flap is pivotally coupled to an upstream flap for relative rotation about a hinge axis. An actuator linkage is coupled to at least one of the upstream flap and the downstream flap for actuating the upstream and downstream flaps between a plurality of throat area conditions. A first mode strut restricts rotation of the downstream flap in a first direction. A second mode strut restricts rotation of the downstream flap in a second direction opposite the first direction.

In various implementations, the actuator linkage may be coupled to the downstream flap along a forward half thereof. The first mode strut may have an extensible and contractible portion that restricts the rotation of the downstream flap in the first direction by resisting extension beyond a first limit. The second mode strut may have an extensible and contractible portion that restricts the rotation of the downstream flap in the second direction by resisting contraction beyond a second limit. The first mode strut may have a first portion coupled to the actuator linkage and a second portion coupled to a static structure, bypassing the actuator linkage. The first mode strut may have a proximal link and an extensible/contractible distal link. The proximal link may have a proximal end pivotally coupled to a static structure and may have a distal end. The distal link may have a proximal end pivotally coupled to the proximal link distal end and a distal end pivotally coupled to the downstream flap. The second mode strut may have an extensible/contractible link having a proximal end pivotally coupled to the static structure and a distally end pivotally coupled to the downstream flap.

Another aspect of the invention involves a turbine engine nozzle having a static structure and a number of flap subassemblies. Each flap subassembly has an upstream flap and a downstream flap. Each upstream flap is pivotally coupled to the static structure for relative rotation about an axis essentially fixed relative to the static structure. Each downstream flap is pivotally coupled to an associated upstream flap for relative rotation about a hinge axis. Means provide a low mode exit area to jet area ratio that is less sensitive to changes in jet area than is a high mode exit area to jet area ratio.

In various implementations, the flap subassemblies may be axisymmetrically arranged about an engine centerline. Articulation may be simultaneous for each of the flap subassemblies. Each of the flap subassemblies may further include an external flap pivotally coupled to the downstream flap. The means may include an extensible and contractible tension stop member. A coupling link may pivotally couple the tension stop member to at least one of the static structure and the downstream flap. A guide link may be coupled to at least one of the tension stop member and the coupling link to control an angle between the coupling link and the tension stop member.

Another aspect of the invention involves a method for retrofitting a gas turbine engine or reengineering a gas turbine engine configuration. The engine or configuration has or has previously had a first nozzle subassembly having a convergent flap, a divergent flap, and an actuation linkage. The method includes installing or engineering a second subassembly. The second subassembly has a second convergent flap, a second divergent flap, and a second actuation linkage. Optionally, the second actuation linkage shares one or more components with the actuation linkage of the first nozzle subassembly. The second actuation linkage is coupled to the second divergent flap so as to permit an aerodynamically-induced mode change articulation of the second divergent flap. A low mode exit area to jet ratio of the second subassembly is less sensitive to changes in jet area than is a low mode exit area to jet area ratio of the first subassembly.

In various implementations, a high mode exit area to jet area ratio of the second subassembly may be essentially the same as a function of said jet area as is a high mode exit area to jet area ratio of the first subassembly. The low mode exit area to jet area ratios of the second subassembly at maximum and minimum jet areas may be essentially the same as are respective low mode exit area to jet area ratios of the first subassembly at maximum and minimum jet areas. The maximum and minimum jet areas may respectively be essentially the same for the first and second subassemblies. Prior to the retrofitting or reengineering, the engine or configuration may have a single first mode strut coupling the static structure to the downstream flap. After the retrofitting or reengineering, the engine or configuration may have first and second mode struts coupling the static structure to the downstream flap. The convergent and divergent flaps may be the same as the second convergent and divergent flaps.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a partially schematic cutaway longitudinal view of a reengineered nozzle in a first condition.

FIG. 5 is a partially schematic view of a mode strut assembly of the nozzle of FIG. 4.

FIG. 8 is a partially schematic cutaway longitudinal view of the nozzle of FIG. 4 in a third condition.

FIG. 9 is a partially schematic view of the mode strut assembly of the nozzle of FIG. 8.

FIG. 10 is a partially schematic cutaway longitudinal view of the nozzle of FIG. 4 in a fourth condition.

FIG. 11 is a partially schematic view of the mode strut assembly of the nozzle of FIG. 10.

FIG. 12 is a partially schematic cutaway longitudinal view of the nozzle of FIG. 4 in a fifth condition.

FIG. 13 is a partially schematic view of the mode strut assembly of the nozzle of FIG. 12.

Like reference numbers and designations in the various drawings indicate like elements.

DETAILED DESCRIPTION

Figure 1:
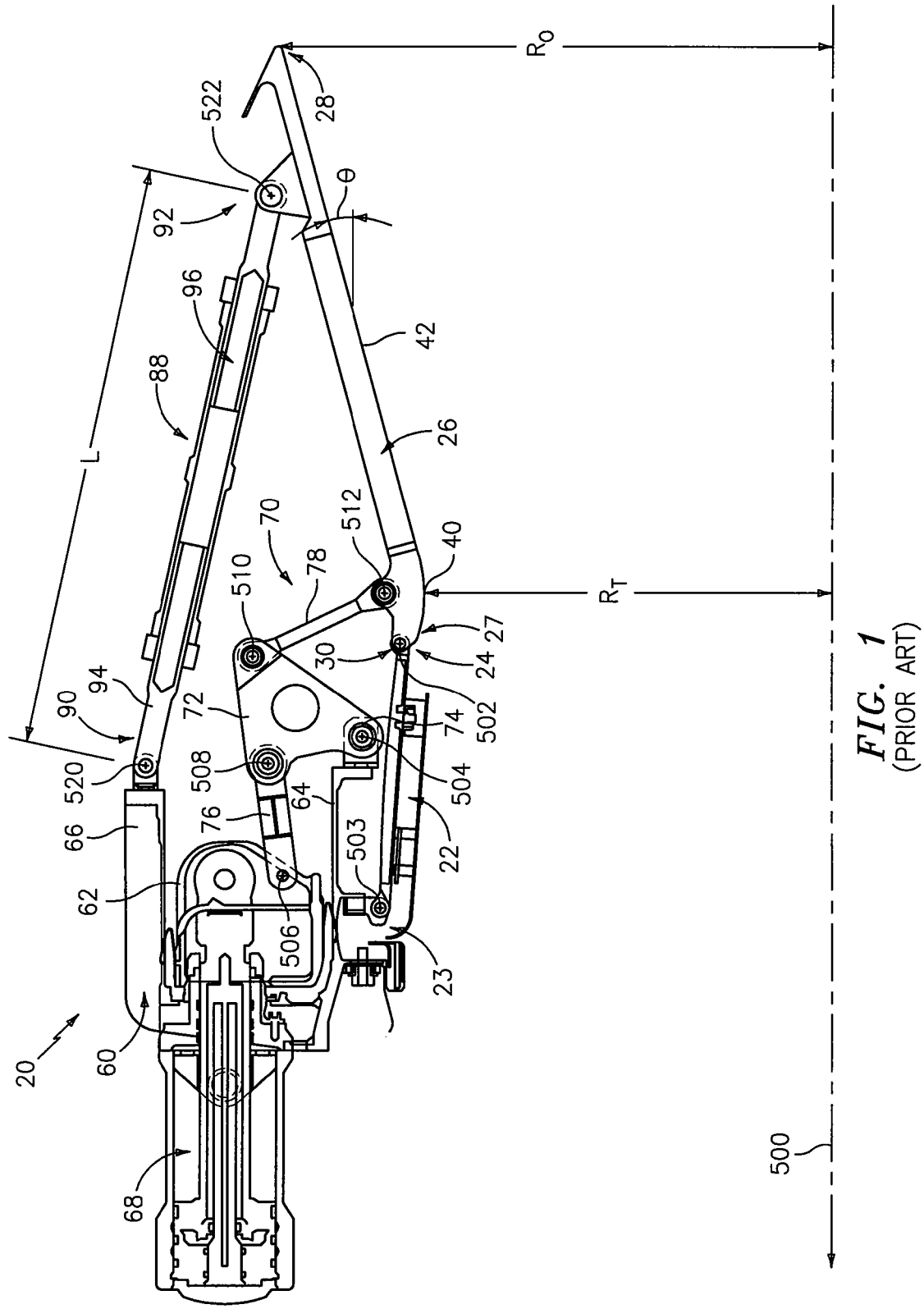
FIG. 1 is a cutaway longitudinal view of a baseline turbine engine nozzle in a first condition.

FIG. 1 shows one exemplary turbine engine nozzle 20 which may form a baseline for a remanufacturing or reengineering according to the present teachings. The exemplary nozzle 20 comprises an axisymmetric circular array of convergent/divergent flap pairs about a nozzle axis or centerline 500. A given flap pair has a convergent flap 22 upstream/forward extending from an upstream end 23 to a downstream end 24 and a divergent flap 26 downstream/aft extending from an upstream end 27 to a downstream end 28. The flaps are hinged relative to each other by a hinge mechanism 30 for relative movement about a hinge axis 502 proximate the convergent flap downstream end 24 and divergent flap upstream end 27.

The inboard surface of the divergent flap 26 has a longitudinally convex surface portion 40 near its upstream end for forming an aerodynamic throat (i.e., the location of smallest passageway cross-section along the downstream flap 26) of the nozzle of instantaneous throat radius $R_T$ and an essentially longitudinally straight portion 42 extending aft therefrom toward the downstream end 28 for forming an exhaust outlet (or "exit") of instantaneous outlet radius $R_O$. For each convergent/divergent flap pair, the nozzle may further include an external flap 43 (shown partially cut-away in FIG. 2). The outboard surface of the external flap would form an exterior contour of the nozzle exposed to external airflow passing around the aircraft fuselage.

FIG. 1 further shows a nozzle static ring structure 60 for mounting the nozzle to the engine, aircraft fuselage, or other environmental structure. Proximate the upstream end 23 of the convergent flap 22, a hinge structure pivotally couples the convergent flap to the static ring structure 60 for relative rotation about a fixed transverse axis 503. A synchronization ring 62 is mounted between inboard and outboard aft portions 64 and 66 of the static ring structure 60 and may be longitudinally reciprocated by actuators 68 (e.g., pneumatic or hydraulic actuators). In the condition of FIG. 1, the synchronization ring is at a forwardmost/upstreammost position along a translatory range of motion. The synchronization ring is coupled to each flap pair by an associated linkage 70. Each linkage 70 includes a central bell crank 72 pivotally coupled by a hinge mechanism to a bell crank ground point 74 at the trailing edge of the static ring structure inboard portion 64 for relative rotation about a fixed transverse axis 504. To drive rotation of the bell crank through its range of rotation about the axis 504, the bell crank is coupled to the synchronization ring by an associated H-link 76. A forward end of the H-link 76 is pivotally coupled to the synchronization ring 62 by a hinge mechanism for relative rotation about a transverse axis 506 which shifts longitudinally with the synchronization ring. An aft end of the H-link 76 is pivotally coupled to the bell crank 72 by a hinge mechanism for relative rotation about a transverse axis 508 which moves along a circular path segment centered about the axis 504 in response to linear translation of the axis 506. Thus, as viewed in FIG. 1, a rearward shift of the synchronization ring 62 produces a clockwise rotation of the bell crank 72 about the axis 504.

Rotation of the bell crank 72 is transferred to articulation of the associated flap pair by an associated pair of transfer links 78. Forward/upstream ends of each pair of transfer links 78 are pivotally coupled to the bell crank for relative rotation about a transverse axis 510 which also moves along a circular path segment centered about the axis 504 in response to linear translation of the axis 506. Aft/downstream ends of the transfer links 78 are pivotally coupled to the divergent flap 26 for relative rotation about a transverse axis 512. As discussed below, in the exemplary embodiment movement of the axis 512 is not entirely dictated by the rotation of the bell crank and associated static ring translation. Rather, it may be influenced by other forces, namely aerodynamic forces arising from relative pressures internal and external to the nozzle. In exemplary embodiments, the axis 512 falls aft of the axis 502 and along a forward half of the span between upstream and downstream ends of the divergent flap.

In the exemplary nozzle 20, a mode strut 88 has a forward end 90 pivotally coupled by a hinge mechanism to the static structure outboard portion 66 for relative rotation about a fixed transverse axis 520. Proximate its downstream end 92, the mode strut is pivotally coupled by a hinge mechanism to the divergent flap 26 (slightly forward of its downstream end 28) for relative rotation about a transverse axis 522. The mode strut is configured so that the span L between the axes 520 and 522 is extensible and contractible such as by having an upstream link 94 (e.g., a piston) telescopically mounted relative to a main body portion 96 (e.g., a cylinder) of the mode strut. The upstream link 94 may extend from the forward/upstream end 90 and couple the mode strut to the static ring structure. The downstream main body portion 96 may extend to the end 92 and couple the mode strut to the divergent flap 26. The extensibility/contractability of the mode strut may have a limited range between maximally contracted and maximally extended conditions.

In operation, the longitudinal position of the synchronization ring 62 determines a nominal throat radius $R_T$ and associated throat area (i.e., a throttle condition). In a given synchronization ring position, the aerodynamic forces may then determine the mode which is nominally associated with the divergent flap interior surface angle θ. FIG. 1 shows the synchronization ring 62 at the forward extremity of its range of motion, thereby establishing the maximum nominal throat area. FIG. 1 further shows a high mode condition in which the aerodynamic forces place the divergent flap in its maximum θ condition with the mode strut 88 in a maximally contracted or bottomed condition of minimum length L.

Figure 2:
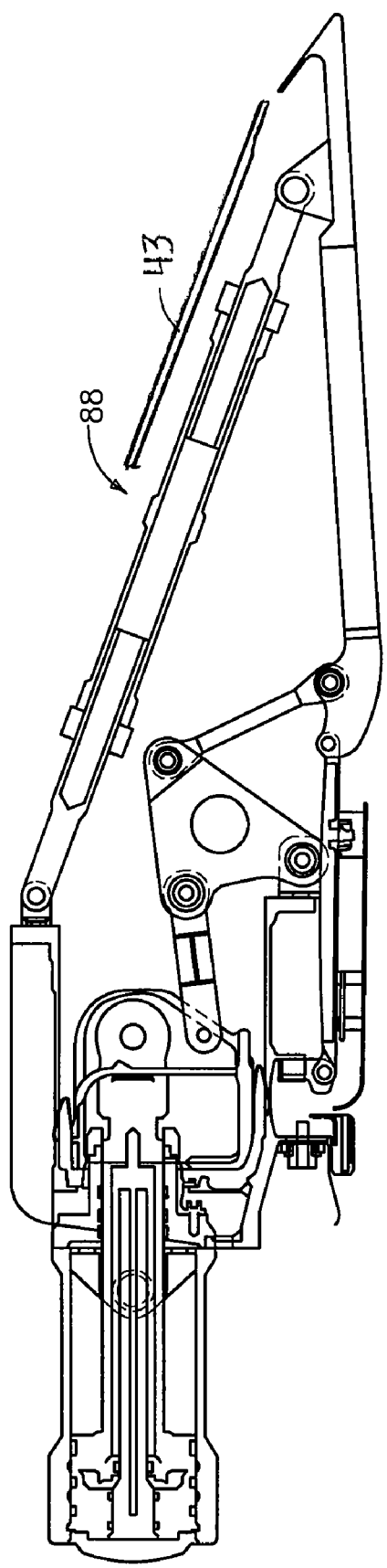
FIG. 2 is a cutaway longitudinal view of the nozzle of FIG. 1 in a second condition.

Under changed conditions, the force balance across the combination of the external flap (if any) and divergent flap 26 may produce an alternate θ. For example, FIG. 2 shows a maximum area, minimum θ (low mode) condition in which the mode strut is maximally extended.

During the transition between high and low modes for a given nominal throat (jet) area, there will be slight movement of the axes 502 and 512. Clearly, the exact location of the instantaneous throat moves slightly along the surface portion 40 which may also entail a slight longitudinal throat position change in addition to a slight throat radius change.

Advantageously, the actuation linkage and flap geometry is chosen to permit a range of throat area conditions effective to address the desired performance envelope. An exemplary envelope would include a maximum throat radius which is about 150% of a minimum throat radius (e.g., in excess of 140%). Similarly, the mode strut and its mounting are configured to provide a desired mode range. An exemplary mode range involves a minimum θ of between −5° and 5° and a maximum θ of between 10° and 25°. Such range may advantageously be provided across all throat areas.

With the foregoing mechanism, once the range of θ is chosen for one of the throat conditions, the range is determined at other throat conditions. The range is, however, not necessarily the same at the different throat conditions. Further flexibility may be desired in determining the permitted range of θ for different throat conditions. For example, with all other parameters of the basic flap system fixed, it may be desired to have a different strut effective range of extensibility/contractibility (i.e., a difference of one or both of the maximum and minimum lengths) in different throat conditions. This may be achieved by a more complex mode strut system.

Figure 3:
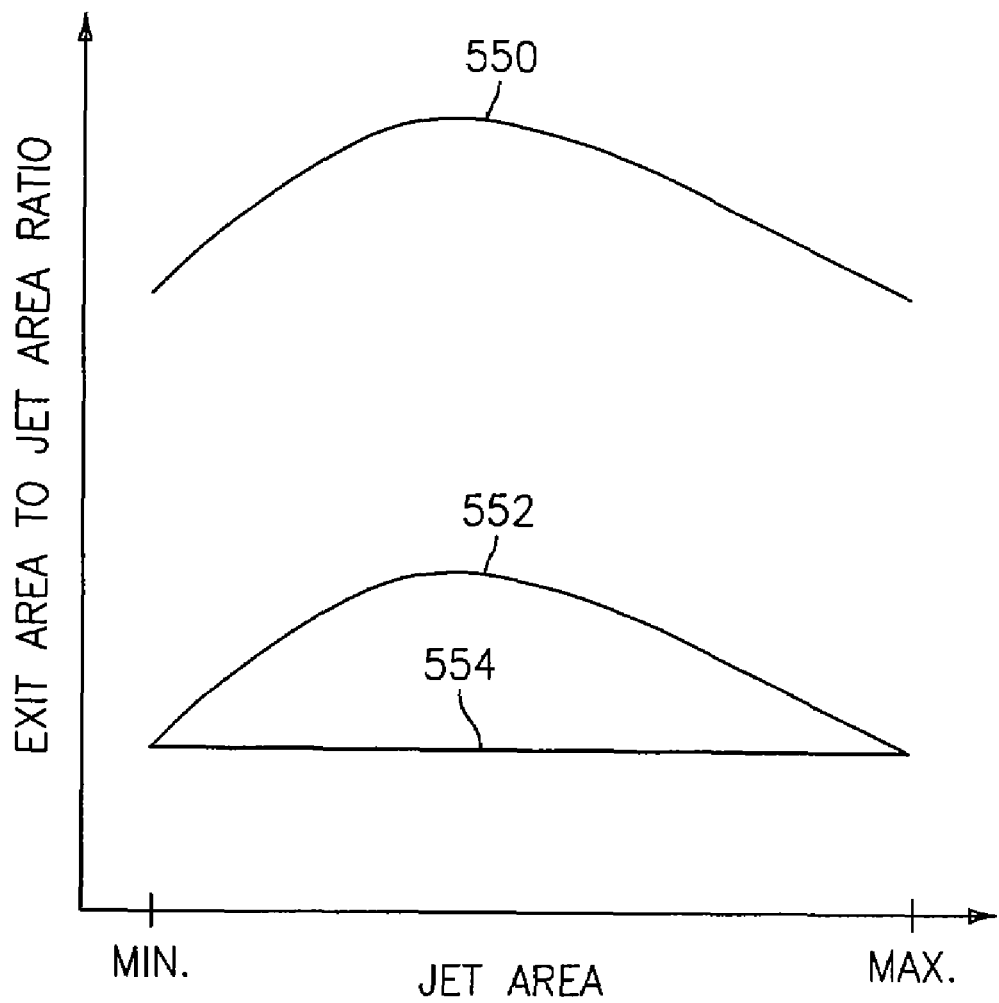
FIG. 3 shows plots of exit to throat (jet) area ratios against jet area ratio for the nozzle of FIG. 1 and a redesigned nozzle.

In one group of implementations, it may be desired to decrease the low mode exit angle θ in intermediate throat conditions. FIG. 3 shows rough plots of the ratio of exit area to throat (jet) area (Y-axis) against jet area (X-axis). Curve 550 shows the high mode ratios for the exemplary baseline nozzle 20. Curve 552 shows the low mode ratios. Both these curves have peaks intermediate the minimum and maximum jet area conditions. It may be advantageous to configure the nozzle so that the low mode ratio plot is less sensitive to jet area (than one or both of the curves 550 and 552). Curve 554 shows one such possibility. Such changes may be achieved as is generally discussed below or by other mechanisms. Yet other changes may alternatively or additionally be achieved. In low mode intermediate throat conditions along the curve 552, the divergent flaps may be subject to substantial aerodynamic forces tending to draw the flaps toward the engine centerline and reduce the exit angle. Resisting these forces places stress on the mode struts and other hardware. By permitting contraction below the curve 552 (e.g., to or toward the curve 554) the force magnitude may be reduced or substantially eliminated. This reduces loading and fatigue, leading to greater reliability and permitting possible lightening of hardware. This may also reduce aerodynamic losses and increase thrust.

FIG. 4 shows a nozzle 120 which may be formed as a remanufacturing or reengineering of the baseline nozzle 20. In the exemplary nozzle 120, many elements of the nozzle 20 may be exactly preserved or may be preserved with slight change. In alternative implementations, more extensive changes may be made. Accordingly, like or substantially like elements are referenced with like numerals. For brevity, not all numerals are re-referenced. The nozzle 120 includes a mode strut assembly 122 which utilizes the same connection features to the ring outboard aft portion 66 and flap 26 at the axes 520 and 522, respectively. The exemplary assembly 122 includes a first extensible and contractible strut assembly 124 and a second contractible and extensible assembly 126. The exemplary first assembly 124 includes first (proximal upward/upstream) and second (distal aft/downstream) telescoping members 128 (e.g., a cylinder) and 130 (e.g., a piston) which may respectively pivotally be mounted at the axes 520 and 522 in a similar fashion as is the mode strut 88 of the baseline nozzle 20.

However, relative to the baseline nozzle 20, one or both of the minimum length and maximum length conditions of the strut assembly 124 may differ relative to the mode strut 88. General construction details of the assembly 124 may be similar to those of the strut 88. In an exemplary implementation to achieve the exemplary decreased low mode sensitivity discussed above, the maximum length condition may be longer than in the baseline nozzle 20, permitting a lower exit angle θ. The length may be such that, in operation, the first assembly 124 never reaches its maximum length condition. Accordingly, the first assembly 124 might be relevant only in compression and not extension. Extension of the second assembly 126 may address the low mode.

The exemplary second assembly 126 includes an aft/downstream member 140 (e.g., a piston) relatively extensible and contractible with an intermediate member 142 (e.g., a cylinder). General construction details of the combination of the downstream member 140 and the intermediate member 142 may be similar to those of the strut 88. An aft/downstream end of the member 140 may be pivotally coupled to the flap 26 for rotation about the axis 522. Upstream, however, the member 142 is indirectly coupled to the static structure by a proximal link 144. The exemplary proximal link 144 (coupling link) is substantially shorter than the combination of members 140 and 142 (which form an extensible distal link). The proximal link 144 has a forward end pivotally coupled to the static structure for rotation about an axis which may be coincident with or close to the axis 520. The link 144 has an aft/distal end pivotally coupled to a forward end of the member 142 for relative rotation about an axis 530. The member 142 is also coupled to the static structure by a guide link 150. The guide link 150 has a first end which may be coupled to the static structure for rotation about an axis 532 which may be coincident with or close to the axis 504. Alternatively, the first end of the guide link 150 may be coupled to the bell crank 72 for such rotation. The guide link 150 has a second end coupled to the intermediate element 142 for relative rotation about an axis 534 spaced-apart from the axis 530. Proximal link and guide link construction details may be similar to those of other links.

The assembly 126 may be configured so that the length $L_2$ between axes 522 and 530 is restricted in at least one of extension and contraction. In the exemplary implementation, the assembly 126 acts in tension to restrict the minimum low mode angle permitted by the members 140 and 142. Accordingly, the maximum $L_2$ is a relevant parameter whereas the minimum $L_2$ might not be implicated in normal use.

In the exemplary implementation, for each strut, one of the assemblies 124 and 126 may be centrally located. There may be two of the other assembly on either side thereof so as to provide torsional stability. For example, FIG. 5 shows a single central second assembly 126 and two first assemblies 124 on either side thereof. FIGS. 4 and 5 show the nozzle 120 in a maximum throat, high mode, condition. In this condition, the strut assemblies 124 are bottomed at their minimum length (schematically shown by stops 160 on the pistons 130 engaging the ends 162 of the cylinders 128). In the exemplary embodiment, the piston 140 is in an intermediate condition relative to the cylinder 142 (e.g., as schematically shown by a piston stop 166 in an intermediate range of travel along a slot 168 in the cylinder 142). The exemplary stop constructions are merely illustrative.

Figure 6:
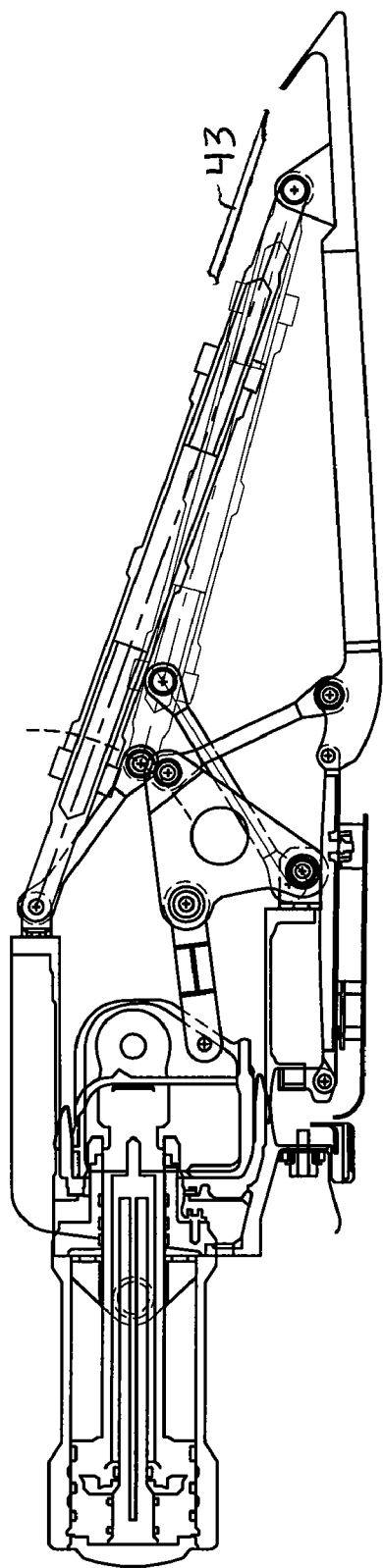
FIG. 6 is a partially schematic cutaway longitudinal view of the nozzle of FIG. 4 in a second condition.
Figure 7:
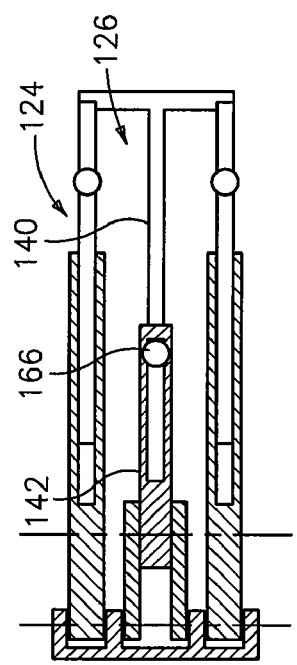
FIG. 7 is a partially schematic view of the mode strut assembly of the nozzle of FIG. 6.

FIGS. 6 and 7 show a maximum throat, low mode condition. In this condition, the piston 140 has reached its maximum extension relative to the cylinder 142 so that the stop 166 is engaged to a distal end of the slot 168. The piston/cylinder combinations of the first assemblies 124 are in an intermediate, not fully compressed/contracted condition. The throat (jet) and exit areas may be substantially the same as those for the baseline nozzle 120 in this condition as may be the angle θ.

FIG. 8 shows the synchronization ring 62 shifted to the rearmost extreme of its range of motion to produce a minimum nominal throat area/radius condition. Specifically, FIGS. 8 and 9 show this in a high mode condition as discussed above. FIG. 9 shows the first strut assemblies 124 in their maximally contracted (bottomed) conditions. The second strut assembly 126 is in an intermediate condition. In the transition from the max throat condition of FIG. 4, the action of the guide link 150 under compression has served as a fulcrum for the member 142 of the assembly 126 pivoting it over center relative to the proximal link 144. The jet and exit areas and the associated exit angle may be the same as for the baseline nozzle in the same condition.

FIGS. 10 and 11 show the nozzle 120 in a low mode, minimum throat area/radius, condition. The second assembly 126 is in a maximally extended condition. The first assemblies 124 are in intermediate conditions. The jet and exit areas and the associated exit angle may be the same as for the baseline nozzle in the same condition.

FIGS. 12 and 13 show the nozzle 120 in an intermediate throat, low mode condition. In this condition, the guide link 150 acts to keep the proximal link 144 and the closer in line with the members 140 and 142 (e.g., an angle α is closer to 180 than in the maximum and minimum throat conditions). This alignment permits the second strut assembly 126 to maintain the maximum length L between axes 520 and 522 longer than that length in the baseline nozzle. Thus the low mode angle θ is less than that of the baseline nozzle for this condition as is the area ratio. In this intermediate throat condition but with a high mode, the assemblies 124 are compressed and may act in the same fashion as the mode strut of the baseline nozzle.

In low mode operation, during throat condition changes the divergent flap articulation may differ from that of the baseline nozzle. In the baseline nozzle, the axis 522 pivots about the axis 520. The nozzle 120 may be freed from this constraint. Geometries may be chosen so that the divergent flap articulation is otherwise. For example, the movement may be such that the axis 522 rotates about a virtual hinge axis 550 (whether fixed or shifting) in a location that might otherwise be unachievable. The effect is as if in the low mode there was a short mode strut between the axes 550 and 522. In the high mode, however, axis 520 may remain as the hinge axis. The exemplary axis 550 is shown substantially downstream and radially inboard of the axis 520. Although other shifts (including different directions and/or different magnitudes are possible), the exemplary shift places the axis 550 much closer to the low mode, minimum throat, radial position (FIG. 6) of the axis 522 than of the axis 520. In that condition, the exemplary longitudinal is also closer to that of axis 522 than 520, but more nearly intermediate. In the low mode, minimum throat, condition of FIG. 10, the radial position is more nearly intermediate (and may be closer to that of axis 520) while the longitudinal position is yet closer to that of axis 522.

The present nozzle may be engineered as a redesign of an existing nozzle or otherwise engineered for an existing environment (e.g., as a drop-in replacement for an existing nozzle). For example, the illustrated nozzle may be formed as a replacement for a generally similar nozzle but wherein a bell crank is connected to the convergent flap (or the hinge point between the convergent and divergent flaps) rather than to the divergent flaps. The reengineering could preserve the synchronization ring and potentially portions of the linkage including the bell crank. Reengineering also could preserve basic details of the external flap and mode strut, although potentially requiring minor geometry tweaks if the exact ranges of throat area and flap angle are to be maintained.

One or more embodiments of the present invention have been described. Nevertheless, it will be understood that various modifications may be made without departing from the spirit and scope of the invention. For example, when implemented as a reengineering of an existing nozzle, various details of the existing nozzle may be preserved either by necessity or for convenience. Additionally, the principles may be applied to non-axisymmetric nozzles in addition to axisymmetric nozzles and to vectoring nozzles in addition to non-vectoring nozzles. Accordingly, other embodiments are within the scope of the following claims.

What is claimed is:

1. A turbine engine nozzle subassembly comprising:
an upstream flap;
a downstream flap pivotally coupled to the upstream flap for relative rotation about a hinge axis;
an actuator linkage coupled to at least one of the upstream flap and the downstream flap for actuating the upstream and downstream flaps between a plurality of throat area conditions;
a first mode strut restricting rotation of the downstream flap in a first direction; and
a second mode strut restricting rotation of the downstream flap in a second direction opposite the first direction.

2. The subassembly of claim 1 wherein the actuator linkage is coupled to the downstream flap along a forward half thereof.

3. The subassembly of claim 1 wherein:
the first mode strut has an extensible and contractible portion that restricts the rotation of the downstream flap in the first direction by resisting contraction beyond a first limit; and
the second mode strut has an extensible and contractible portion that restricts the rotation of the downstream flap in the second direction by resisting extension beyond a second limit.

4. The subassembly of claim 1 wherein the second mode strut has:
a first portion coupled to the actuator linkage; and
a second portion coupled to a static structure, bypassing the actuator linkage.

5. The subassembly of claim 1 wherein:
the second mode strut has:
a proximal link having:
a proximal end pivotally coupled to a static structure; and
a distal end; and
an extensible/contractible distal link having:
a proximal end pivotally coupled to the proximal link distal end; and
a distal end pivotally coupled to the downstream flap; and
the first mode strut has an extensible/contractible link having:
a proximal end pivotally coupled to the static structure; and
a distal end pivotally coupled to the downstream flap.

6. A turbine engine nozzle comprising:
a static structure;
a plurality of flap subassemblies each comprising:
an upstream flap pivotally coupled to the static structure for relative rotation about an axis essentially fixed relative to the static structure; and
a downstream flap pivotally coupled to the upstream flap for relative rotation about a hinge axis; and
means for providing a low mode exit area to jet area ratio that is less sensitive to changes in jet area than is a high mode exit area to jet area ratio.

7. The nozzle of claim 6 wherein:
the plurality of flap subassemblies are axisymmetrically arranged about an engine centerline;

articulation is simultaneous for each of the flap subassemblies; and each of the flap subassemblies further comprises an external flap pivotally coupled to the downstream flap.

8. The nozzle of claim 7 wherein:

the means comprises an extensible and contractible tension stop member;

a coupling link pivotally coupling the tension stop member to at least one of the static structure and the downstream flap; and a guide link coupled to at least one of the tension stop member and the coupling link to control an angle between the coupling link and the tension stop member.

9. The nozzle of claim 6 wherein:

the means comprises an extensible and contractible tension stop member;

a coupling link pivotally coupling the tension stop member to at least one of the static structure and the downstream flap; and a guide link coupled to at least one of the tension stop member and the coupling link to control an angle between the coupling link and the tension stop member.

10. The subassembly of claim 2 wherein:

the first mode strut has an extensible and contractible portion that restricts the rotation of the downstream flap in the first direction by resisting contraction beyond a first limit; and the second mode strut has an extensible and contractible portion that restricts the rotation of the downstream flap in the second direction by resisting extension beyond a second limit.

11. The subassembly of claim 2 wherein the second mode strut has:

a first portion coupled to the actuator linkage; and a second portion coupled to a static structure, bypassing the actuator linkage.

12. The subassembly of claim 2 wherein:

the second mode strut has:

a proximal link having:

a proximal end pivotally coupled to a static structure; and a distal end; and an extensible/contractible distal link having:

a proximal end pivotally coupled to the proximal link distal end; and a distal end pivotally coupled to the downstream flap; and the first mode strut has an extensible/contractible link having:

a proximal end pivotally coupled to the static structure; and a distal end pivotally coupled to the downstream flap.

13. The subsassembly of subassembly of claim 2 wherein the second mode strut has:

a first link coupled to the actuator linkage; and a second link coupled to a static structure, bypassing the actuator linkage.

\* \* \* \* \*